(12) United States Patent
Hatton

(10) Patent No.: US 6,334,526 B1
(45) Date of Patent: Jan. 1, 2002

(54) HYBRID CLOSED LOOP CONVEYOR

(75) Inventor: Gerald Hatton, Bayview (AU)

(73) Assignee: Mannesmann Dematic Colby PTY Limited, Frenchs Forest (AU)

( * ) Notice: Subject to any disclaimer, the term of this patent is extended or adjusted under 35 U.S.C. 154(b) by 0 days.

(21) Appl. No.: 09/125,551

(22) PCT Filed: Feb. 27, 1997

(86) PCT No.: PCT/AU97/00115

§ 371 Date: Sep. 22, 1998

§ 102(e) Date: Feb. 22, 1998

(87) PCT Pub. No.: WO97/31844

PCT Pub. Date: Sep. 4, 1997

(30) Foreign Application Priority Data

Feb. 27, 1996 (AU) .............................................. PN 8333

(51) Int. Cl.[7] .............................................. B65G 17/00
(52) U.S. Cl. ..................... 198/469.1; 198/839; 198/859
(58) Field of Search ................................ 198/837, 852, 198/469.1

(56) References Cited

U.S. PATENT DOCUMENTS

| 3,416,645 | A | * | 12/1968 | Jones | 198/582 |
|---|---|---|---|---|---|
| 3,718,249 | A | * | 2/1973 | Hess | 198/181 |
| 3,777,877 | A | * | 12/1973 | Piper | 198/852 |
| 3,856,133 | A | * | 12/1974 | Dyachkov | 198/831 |
| 3,881,592 | A | * | 5/1975 | Stimpson | 198/852 |
| 3,895,691 | A | * | 7/1975 | Shiraishi | 198/852 |
| 4,241,822 | A | * | 12/1980 | Molins et al. | 198/457.03 |
| 4,429,785 | A | * | 2/1984 | Dango | 198/852 |
| 4,461,378 | A | * | 7/1984 | Roth | 198/839 |
| 4,834,839 | A | * | 5/1989 | Harrison | 198/839 |
| 5,127,515 | A | * | 7/1992 | Damkjaer | 198/852 |

* cited by examiner

Primary Examiner—Douglas Hess
(74) Attorney, Agent, or Firm—Cohen, Pontani, Lieberman & Pavane

(57) ABSTRACT

A conveyor, such as a baggage reclaim or air-side collection carousel, having a moving surface with overlapping flat plates. The plates are horizontal in some portions of the conveyor, and are tilted in at least one other portion of the conveyor, with transition portions in-between. Articles on the conveyor are thus urged towards one side of the moving surface for easier removal of articles from the conveyor.

9 Claims, 2 Drawing Sheets

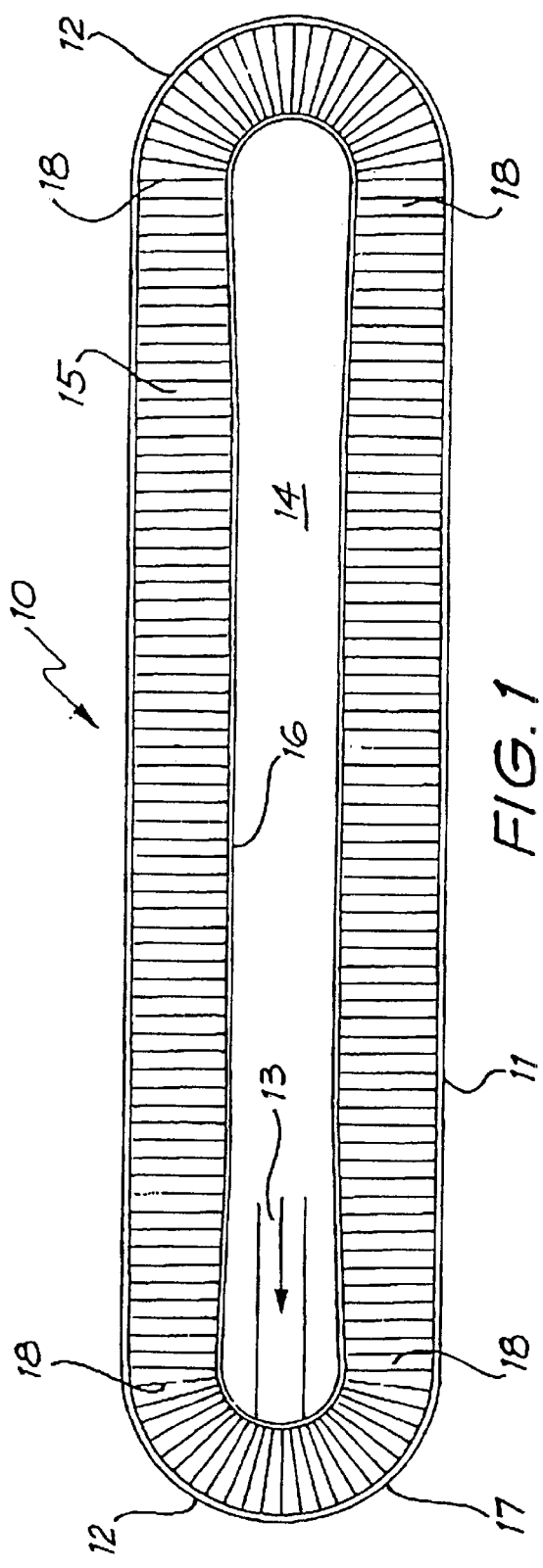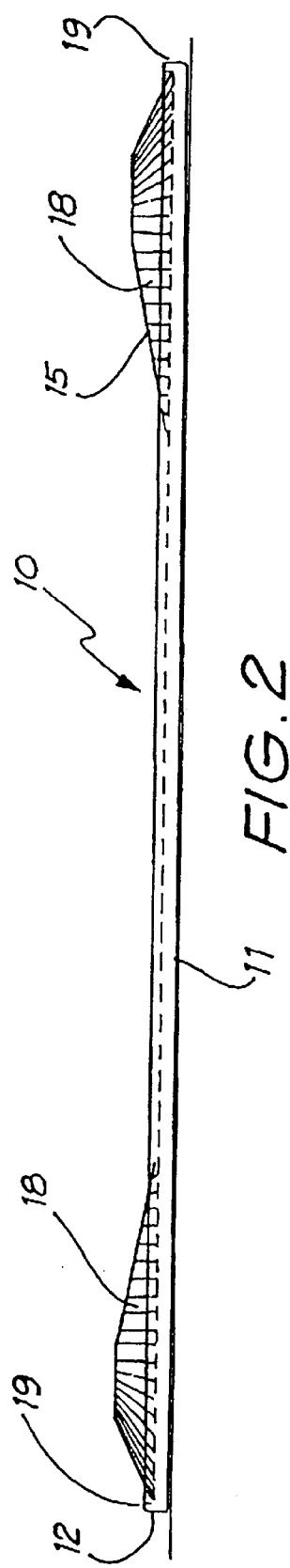

HYBRID CLOSED LOOP CONVEYOR

TECHNICAL FIELD

The invention pertains to conveyors and more particularly to a recirculating or closed loop conveyor having both horizontal and inclined portions.

BACKGROUND ART

In, for example, a baggage reclaim or air-side collection carousel, the capacity to hold and recirculate accumulated baggage is an asset. It is desirable to provide as much accumulation as possible for a given carousel size One solution is to increase the width of the recirculating conveyor from which baggage is ultimately collected. This is why many such systems are designed to be about as wide as two suitcases. However, in a purely horizontal conveyor, the extra width imposes an inconvenience to those wishing to lift baggage from the interior edge. This inconvenience is addressed by filly inclined recirculating conveyors which are seen, for example, in international baggage reclaim areas. In these systems the entire moving surface of the carousel is inclined or tilted by about 25 degrees. In this way, baggage is urged toward the exterior edge by gravity. The disadvantages of the inclined carousel stem from the presence of a lip or bumper peripheral to the moving surface. First, baggage must be lifted up and over the bumper. For baggage handling staff, this is a considerable imposition Second, the pressure exerted by an upper bag onto a lower one makes removal all the more difficult, particularly when the lower bag's handle is trapped against the bumper or the upper bag.

SUMMARY OF THE INVENTION

It is an object of the present invention to provide a conveyor which goes at least some way towards overcoming or at least minimizing the prior art problems or limitations outlined above.

It is another object of the present invention to provide a conveyor which has the accumulation and access of an inclined carousel and the baggage lifting ease of a horizontal carousel.

It is a further object of the invention to provide a conveyor having horizontal, tilted and transition sections.

It is yet another object of the invention to provide a conveyor having a moving surface comprising flat plates that overlap, which plates are horizontal in some portions of the conveyor and which are tilted in at least one other portion of the conveyor, the conveyor also having transition portions.

These and other objects of this invention will become more apparent from the following descriptions and drawings.

According to one aspect of the present invention there is provided a conveyor having a moving surface comprising a plurality of overlapping flat plates disposed across the conveyor transversely to the direction of travel of the moving surface, wherein throughout the route of the conveyor surface the plates in at least one location are disposed transversely inclined across the conveyor at an angle to the horizontal whereby discrete articles being transported on the conveyor surface are urged to move under gravity towards the lower side of the transversely inclined locations of the conveyor and in at least one other location the plates are disposed horizontally across the conveyor, with transition zones in-between, and wherein a raised sidewall is disposed adjacent but spaced from the conveyor surface along the lower side of the transversely inclined locations of the conveyor.

BRIEF DESCRIPTION OF THE ACCOMPANYING DRAWINGS

The invention will now be described by way of example only and with reference to the drawings, wherein:

FIG. 1 is a plan view of a conveyor according to the teachings of the present invention.

FIG. 2 is a side elevation of a conveyor according to the teachings of the present invention.

DETAILED DESCRIPTION OF THE PREFERRED EMBODIMENTS

Figure 3:
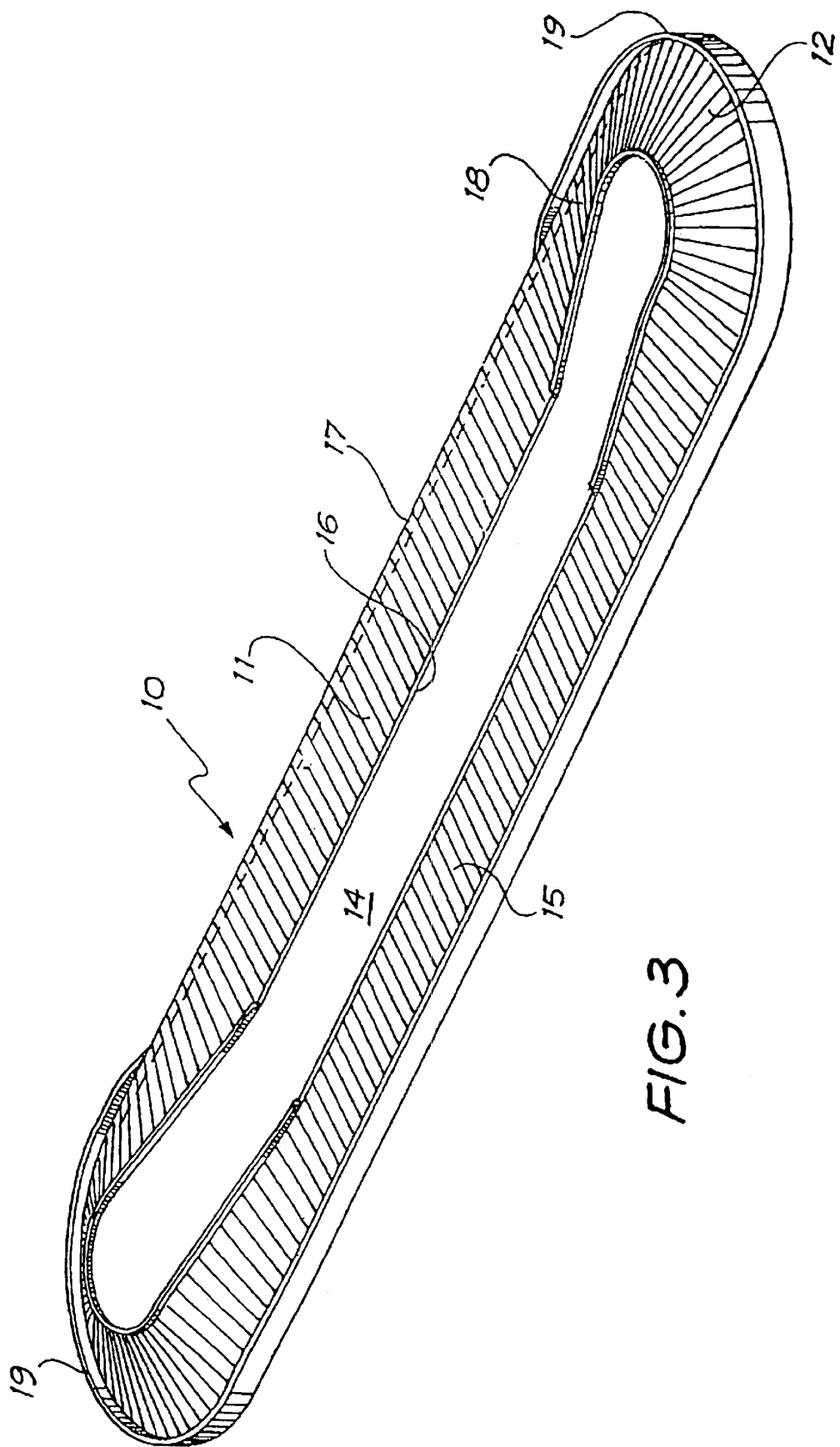
FIG. 3 is a perspective view of a conveyor according to the teachings of the present invention.

As shown for example in FIG. 1, a recirculating loop conveyor 10 comprises both straight sections 11 and at least two turns 12. In the example illustrated by FIG. 1, two 180 degree turns are provided. It will be understood that other closed loop configurations are also within the ambition of the invention.

The configuration depicted, particularly when applied as a baggage reclaim or air-side handling carousel, is characterized as cooperating with another conveyor, generally an infeed conveyor. The infeed conveyor 13 preferably brings baggage from another level, through the interior 14 of the loop and deposits the baggage onto one of the tilted portions 12.

Bags deposited by the infeed conveyor 13 are urged by gravity away from the interior edge 16 of the surface toward the exterior edge 17. This depositing region occupies a tilted portion, whether it be on a turn or not. If another piece of baggage occupies the exterior edge 17, the two pieces will travel around the conveyor 10 side-by-side toward, then onto the straight, horizontal portion 11. Passengers or staff will generally handle baggage from the one or more long un-bumpered horizontal portions 11. Naturally, baggage adjacent the exterior edge 17 will be more accessible and will have a higher probability of being collected. Because the horizontal portions need no lower bumper to keep baggage on the conveyor surface (as shown in FIG. 3), lifting is made considerably easier. The next turn is preferably inclined or tilted, but may be flat. Where the turn is tilted, as shown for example in FIGS. 1–3, an uncollected bag occupying a position toward the interior edge 16 will slide down the incline toward the exterior edge 17. At least in the tilted portions, and preferably only there, the exterior edge is provided with a raised bumper 19 which prevents baggage from sliding off of the moving surface 15. Thus all baggage will evenly come to rest on an un-bumpered, horizontal exterior edge 17 for convenient collection or handling.

Importantly, the flat overlapping plates that make up the moving surface 15 move through a transition zone 18. In this zone 18 the tilt or inclination of the plates, reverse to the direction of travel, varies gradually from flat to the maximum tilt angle of about 25 degrees.

In the above example, the tilted portions of the moving surface have been illustrated as particular to the turns. However, the benefits of the invention are also equally attained where the infeed and tilted portion(s) of the moving surface 15 are located along a straight portion, regardless of the configuration of the turns. The important features are that the carousel comprises both horizontal and tilted portions, that the moving surface is wide enough for more than one bag and that at least one horizontal portion be free from a peripheral bumper. The invention thus offers increased surface area and accumulation without the collection inconvenience associated with closed loop systems in which the moving surface is always tilted and requires a bumper around the entire carousel.

While the invention has been described with reference to a particular embodiment, this specific disclosure should be understood as having been provided by way of example and not as a limitation to the scope or value or the teachings. In particular, the layout or shape of the conveyor is considered a detail of construction.

Further it will be apparent to those having ordinary skill in the art hat a number of changes, modifications or alterations to the invention described herein may be made, none of which depart from the spirit of the present invention. All such changes, modifications, and alterations should therefore be seen as being within the scope of the present invention.

What is claimed is:

1. A baggage conveyor comprising:

a plurality of overlapping flat plates disposed transversely to a direction of travel of a moving surface defined by the plates, the conveyor being movable along a route, the conveyor being configured so that in at least one location along the route the plates are disposed transversely inclined across the conveyor at an angle to horizontal so that discrete articles being transported on the moving surface are urged by gravity toward a lower side-edge of the transversely inclined location, the conveyor having at least one other location in which the plates are disposed horizontally across the conveyor, the conveyor further having transition zones between the inclined and horizontal locations; and a raised sidewall disposed adjacent and spaced from the moving surface along the lower side-edge of the conveyor in the transversely inclined location, the conveyor route having an elongated loop configuration with two end regions, at least one of the end regions having the inclined location so that the plates are disposed at an angle across a width of the conveyor so as to be inclined downwardly from an inner peripheral edge of the conveyor surface towards an outer peripheral edge.

2. A conveyor as defined in claim 1, wherein the plates in said at least one inclined location are disposed at an angle which at its highest point is about 25° to the horizontal.

3. A conveyor as defined in claim 2, wherein the transitions zones include a first transition zone in which, in the direction of travel, the angle of the plates from horizontal increases from a lowest point through to a maximum height, and a second transition zone in which the angle of the plates from horizontal decreases from the maximum height through to the lowest point.

4. A conveyor as defined in claim 3, wherein in the first transition zone, the angle from the horizontal increases from about 0° to about 25° and in the second transition zone the angle from the horizontal decreases from about 25° to about 0°.

5. A conveyor as defined in claim 1, wherein the conveyor is a recirculating loop conveyor.

6. A conveyor as defined in claim 1, wherein the conveyor is one of a baggage reclaim carousel and an air-side collection carousel.

7. A conveyor as defined in claim 1, wherein the raised sidewall extends along the entire edge of the conveyor.

8. A conveyor as defined in claim 7, wherein the raised sidewall is padded.

9. A conveyor as defined in claim 1, and further comprising an additional sidewall disposed adjacent and spaced from an inner edge of the conveyor.

* * * * *